US010067399B2

(12) United States Patent
Lim et al.

(10) Patent No.: US 10,067,399 B2
(45) Date of Patent: Sep. 4, 2018

(54) TRANSMITTANCE-VARIABLE FILM AND METHOD FOR PRODUCING SAME

(71) Applicant: LG Hausys, Ltd., Seoul (KR)

(72) Inventors: Ji-Won Lim, Seoul (KR); Min-Hee Lee, Gunpo-si (KR); Ji-Yeon Kim, Seoul (KR); Dong-Eung Kim, Gunpo-si (KR)

(73) Assignee: LG Hausys, Ltd., Seoul (KR)

( * ) Notice: Subject to any disclaimer, the term of this patent is extended or adjusted under 35 U.S.C. 154(b) by 138 days.

(21) Appl. No.: 15/039,394

(22) PCT Filed: Oct. 28, 2014

(86) PCT No.: PCT/KR2014/010189
§ 371 (c)(1),
(2) Date: May 25, 2016

(87) PCT Pub. No.: WO2015/080385
PCT Pub. Date: Jun. 4, 2015

(65) Prior Publication Data
US 2017/0153525 A1    Jun. 1, 2017

(30) Foreign Application Priority Data
Nov. 28, 2013  (KR) .................... 10-2013-0146486

(51) Int. Cl.
*G02F 1/167*    (2006.01)
*G02F 1/1333*   (2006.01)

(52) U.S. Cl.
CPC ........ *G02F 1/167* (2013.01); *G02F 1/133305* (2013.01); *G02F 1/133345* (2013.01);
(Continued)

(58) Field of Classification Search
CPC .............. G02F 1/167; G02F 1/133345; G02F 1/133305; G02F 2001/1678; G02F 2001/1672; G02F 2001/1676
See application file for complete search history.

(56) References Cited

U.S. PATENT DOCUMENTS

2001/0030639 A1   10/2001   Goden et al.
2005/0111075 A1    5/2005   Kaneko et al.

FOREIGN PATENT DOCUMENTS

CN      1171614 A    1/1998
CN      1402069 A    3/2003
(Continued)

OTHER PUBLICATIONS

Korean Office Action dated Apr. 14, 2017 in connection with the counterpart Korean Patent Application No. 1020130146486.
(Continued)

*Primary Examiner* — Joseph P Martinez
(74) *Attorney, Agent, or Firm* — Hauptman Ham, LLP

(57) ABSTRACT

The present invention relates to a transmittance-variable film and a method for producing the same, the film comprising: a transparent substrate; a wire electrode formed on the top of the transparent substrate; an insulating layer formed on the top of the wire electrode; a plurality of partition walls positioned on both sides of the wire electrode; a transparent electrode formed on the top of the plurality of partition walls; a cell configured to be surrounded by the plurality of partition walls, the insulating layer and the transparent electrode; and a charged particle fluid contained inside the cell, wherein the insulating layer is formed with a thickness of 0.4 to 1 μm.

12 Claims, 2 Drawing Sheets

(52) U.S. Cl.
CPC ............... *G02F 2001/1672* (2013.01); *G02F 2001/1676* (2013.01); *G02F 2001/1678* (2013.01)

(56) References Cited

FOREIGN PATENT DOCUMENTS

| | | | |
|---|---|---|---|
| CN | 1774659 A | | 5/2006 |
| JP | 3-29834 U | | 3/1991 |
| JP | 2000330142 A | | 11/2000 |
| JP | 2004-509781 A | | 4/2004 |
| JP | 2009-509206 A | | 3/2009 |
| JP | 2011002695 A | | 1/2011 |
| JP | 2012-73301 A | | 4/2012 |
| JP | 2012-252091 A | | 12/2012 |
| JP | 2013235097 A | | 11/2013 |
| KR | 1020010033200 A | | 4/2001 |
| KR | 1020030078626 A | | 10/2003 |
| KR | 10-2011-0103759 A | * 9/2011 | ............ G02F 1/167 |
| KR | 1020110103752 A | | 9/2011 |
| KR | 1020110103759 A | | 9/2011 |
| KR | 10-2012-0011532 A | * 2/2012 | ............ G02F 1/167 |
| KR | 1020120011532 A | | 2/2012 |
| KR | 1020120121121 A | | 11/2012 |
| TW | 201319659 A1 | | 5/2013 |

OTHER PUBLICATIONS

European Search Report dated Nov. 7, 2016 corresponding to European Patent Application No. 4865494.0.
International Search Report dated Jan. 21, 2015 corresponding to International Application PCT/KR2014/010189.
Taiwanese Office Action dated Jan. 12, 2018 in connection with the counterpart Taiwanese Patent Application No. 10720036860.
Japanese Office Action dated Mar. 13, 2018 in connection with the counterpart Japanese Patent Application No. 2016-534730.
Chinese Office Action dated Apr. 28, 2018, in connection with the Chinese Patent Application No. 201480065406.6 citing the above reference(s).

* cited by examiner

TRANSMITTANCE-VARIABLE FILM AND METHOD FOR PRODUCING SAME

TECHNICAL FIELD

The present disclosure relates to a transmittance variable film using a voltage and a method for producing the same.

BACKGROUND

Conventional transmittance variable film is activated by a polymer dispersed liquid crystal (PDLC) or an electrochromism (EC). In PDLC film, an encapsulated liquid crystal is present in a polymer and the reflectance and transmittance is adjusted by controlling the orientation of the crystal by an electric field. In EC film, the transmittance is adjusted using a material whose color is changed by an electric field. With recent increase of interests in a variety of display devices and functional glasses, there is an increasing trend in interests for a transmittance variable film with a high performance and high energy efficiency.

DISCLOSURE

Technical Problem

One aspect of the present disclosure is to provide a transmittance variable film with excellent variation in transmittance and durability, while it can be driven at a low voltage.

Another aspect of the present disclosure is to provide a method for producing the transmittance variable film.

Technical Solution

In one embodiment of the present disclosure, there is provided a transmittance variable film, the film comprising: a transparent substrate; a wire electrode formed on the transparent substrate; an insulating layer formed on the wire electrode; a plurality of partition walls positioned on both sides of the wire electrode; a transparent electrode formed on the plurality of partition walls; a cell configured to be surrounded by the plurality of partition walls, the insulating layer and the transparent electrode; and a charged particle fluid contained inside the cell, wherein the insulating layer may be formed with a thickness of 0.4 µm to 1 µm.

In the transmittance variable film, the insulating layer and the partition walls may be integrally formed of a same material.

The insulating layer and the partition walls may include at least one selected from the group consisting of urethane acrylate, epoxy acrylate, polyester acrylate, polyether, and combinations thereof.

The wire electrode may be formed of a metal-mesh including silver, copper or aluminum.

The metal-mesh may have a line width of 2 µm to 20 µm, and a line interval of 40 µm to 300 µm.

The transparent substrate may include at least one selected from the group consisting of polyethylene terephthalate (PET), polyvinyl chloride (PVC), thermoplastic polyurethane (TPU), and combinations thereof.

The charged particle fluid may include a plurality of charged particles dispersed in a hydrocarbon-based medium.

The hydrocarbon-based medium may include at least one selected from the group consisting of n-dodecane, methyl methacrylate (MMA), undecane, and combinations thereof.

The plurality of the charged particles may have a same charge one another.

The transparent electrode may include an indium-tin oxide (ITO), a fluorine-tin oxide (FTO), an aluminum-zinc oxide (AZO), or a gallium-zinc oxide (GZO).

The transmittance variable film may have a variation in transmittance of 20% to 70%, as calculated by the following formula (1):

$$\text{Variation in Transmittance (\%)} = \text{Final Transmittance (\%)} - \text{Initial Transmittance (\%)} \quad (1)$$

In another embodiment of the present disclosure, there is provided a method for producing a transmittance variable film, the method comprising: preparing a transparent substrate; forming a wire electrode on the transparent substrate via printing or etching process; forming an insulating layer and a plurality of partition walls integrally on the transparent substrate and the wire electrode via roll-to-roll process; curing the insulating layer and the plurality of the partition walls; forming a transparent electrode on the plurality of the partition walls; and injecting a charged particle fluid into a cell configured to be surrounded by the plurality of the partition walls, the insulating layer and the transparent electrode, wherein the insulating layer may be formed with a thickness of 0.4 µm to 1 µm.

The step of forming an insulating layer and a plurality of partition walls integrally may include providing a roll around which a mold with a structure of the plurality of the partition walls imprinted therein is wound; applying a resin composition to the roll; and rolling the roll over the transparent substrate and the wire electrode.

The resin composition may include at least one selected from the group consisting of urethane acrylate, epoxy acrylate, polyester acrylate, polyether, and combinations thereof.

Advantageous Effects

The transmittance variable film may implement a fast variation in transmittance even at a low voltage, and is applicable to a glass for a variety of display devices and windows.

The method for producing a transmittance variable film may provide advantages of saving the production cost and reducing the production time, while at the same time providing a transmittance variable film with a rapid variation rate in the transmittance and high energy efficiency.

DESCRIPTION OF DRAWINGS

The above and other objects and features of the present disclosure will become apparent from the following description of the disclosure, when taken in conjunction with the accompanying drawings, in which.

Figure 1:
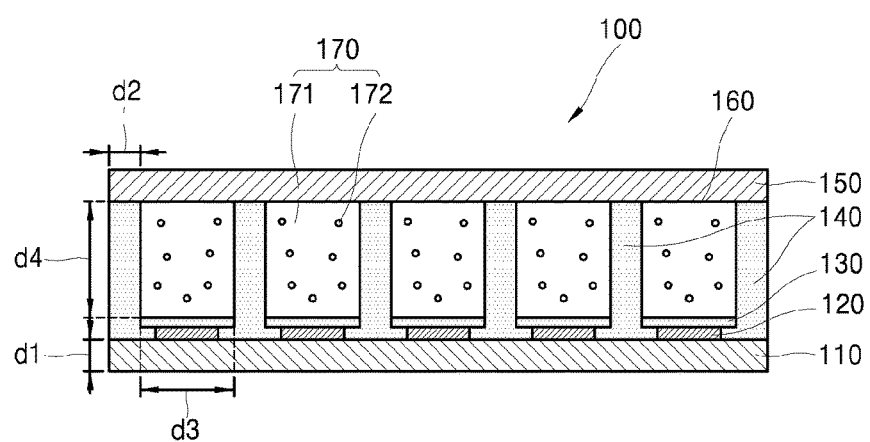
FIG. 1 shows a transmittance variable film in accordance with one embodiment of the present disclosure, prior to applying a voltage.

BRIEF DESCRIPTION OF SYMBOLS 100, 200: transmittance variable film
110: transparent substrate
120: wire electrode
130: insulating layer
140: partition walls
150: transparent electrode 160: cell
170: charged particle fluid
171: hydrocarbon-based medium
d1: thickness of transparent substrate
d2: width of partition wall
d3: interval of partition wall
d4: height of partition wall Best Mode Hereinafter, exemplary embodiments will be described in detail with reference to the accompanying drawings so as to be easily practiced by a person of ordinary skill in the art. However, It should be understood that the present disclosure is not to be construed as limited to the exemplary embodiments set forth herein and may be embodied in many different forms. Like reference numerals refer to like elements throughout the specification. In the drawings, lengths or thicknesses are enlarged for clarity of various layers and regions. In addition, lengths or thicknesses of some layers and regions are exaggerated for convenience of description.

Further, it will be understood that when an element such as a layer, region or substrate is referred to as being "on" or extending "onto" another element, it can be directly on or extend directly onto the other element or intervening elements may also be present.

Transmittance Variable Film

In one embodiment of the present disclosure, there is provided a transmittance variable film, the film comprising: a transparent substrate; a wire electrode formed on the transparent substrate; an insulating layer formed on the wire electrode; a plurality of partition walls positioned on both sides of the wire electrode; a transparent electrode formed on the plurality of the partition walls; a cell configured to be surrounded by the plurality of the partition walls, the insulating layer and the transparent electrode; and a charged particle fluid contained inside the cell, wherein the insulating layer may be formed with a thickness of 0.4 μm to 1 μm In general, when the insulating layer is formed on an electrode with a predetermined thickness to prevent electrons from leaking to the electrode, damages to an electric field generated due to the insulating layer increases a driving voltage for operating an element. Particularly in the case where the element is a transmittance variable film, it leads to a less variation in transmittance, therefore narrowing the application field of the element.

In order to solve the above mentioned problem, the transmittance variable film may have a wire electrode and an insulating layer formed on the wire electrode, wherein the thickness of the insulating layer may be about 0.4 μm to about 1 μm, whereby rapid variation in the transmittance is possible even at a low driving voltage.

Particularly, the thickness of the insulating layer may be from about 0.4 μm to about 1 μm, and more particularly about 1 μm. When the thickness of the insulating layer is less than about 0.4 μm, it is difficult to form the insulating layer on the wire electrode, due to which the production process becomes complicated, and further it is difficult to achieve an effect of preventing a charge transfer phenomena. In addition, when the thickness of the insulating layer exceeds about 1 μm, the insulating layer interrupts the flow of an electric field, due to which the driving voltage may be increased to ensure a rapid variation in the transmittance.

Figure 2:
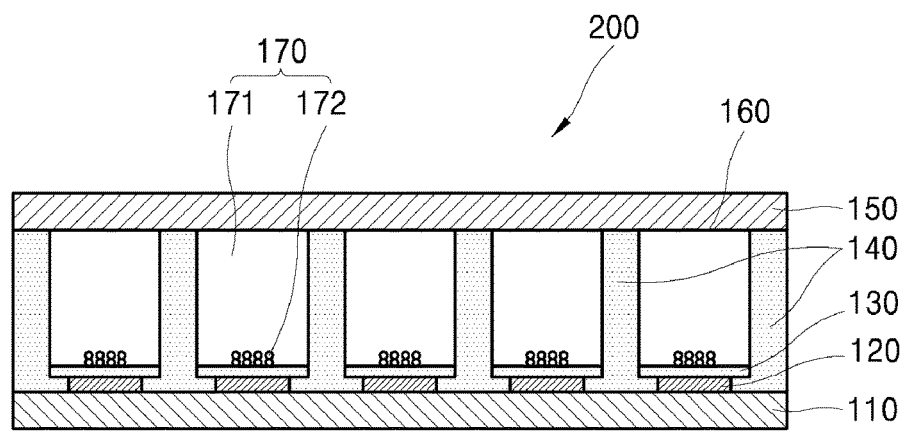
FIG. 2 shows a transmittance variable film after applying a voltage.

Referring now to FIGS. 1 and 2, the transmittance variable film will be described in detail.

FIGS. 1 and 2 illustrate cross-sectional views of a transmittance variable film 100 and 200 in accordance with one embodiment of the present disclosure, respectively, which includes a transparent substrate 110, a wire electrode 120, an insulating layer 130, plurality of partition walls 140, a transparent electrode 150, a cell 160, and a charged particle fluid 170. Particularly, FIG. 1 shows a transmittance variable film prior to applying a voltage (OFF mode), and FIG. 2 shows a transmittance variable film after applying a voltage (ON mode).

The transparent substrate 110 is configured to secure transparency of the transmittance variable film and impart durability as a support. The transparent substrate 110 may be a transparent resin, and include at least one selected from the group consisting of polyethylene terephthalate (PET), polyvinyl chloride (PVC), thermoplastic polyurethane (TPU), and combinations thereof. In one embodiment, the transparent substrate 110 may be a polyethylene terephthalate (PET), whereby a transmittance variable film 200 having excellent transparency and durability can be achieved.

The thickness d1 of the transparent substrate 110 may be about 50 μm to about 200 μm, and particularly about 120 μm to about 150 μm. When the transparent substrate 110 is formed with a thickness within the above range, it may provide an excellent durability as a support for the transmittance variable film, and also provide an advantageous effect on the visibility since it prevents unevenness caused by at least in part a warpage of the film.

The transmittance variable film may include a wire electrode 120 formed on the transparent substrate 110. The wire electrode 120 may act as a positive electrode (cathode). As a voltage is applied, the wire electrode 120 interacts with charged particles 172 o serve to change transmittance. Specifically, when a voltage is applied to the transmittance variable film 100, the charged particles 172 that have been dispersed in the charged particle fluid 170 are assembled on top of the wire electrode 120 by an electrical power, with the transmittance being increased.

The wire electrode 120 may be formed of a metal-mesh including silver, copper or aluminum. In one embodiment, the wire electrode 120 may be formed of a metal-mesh including silver, so that it is possible to provide a beneficial effect in terms of the electrical conductivity and the corrosion resistance. In particular, the wire electrode 120 may be formed through laminating the metal-mesh on the transparent substrate 110 via printing or etching process. As a result, the etching process which results in a severe environmental pollution and the deposition process which consumes lots of energy can be simplified to thereby make the processes environmentally friendly.

The metal-mesh may have a line width of about 2 μm to about 20 μm and a line interval of about 40 μm to about 300 μm. Specifically, the metal-mesh may have a line width of about 5 μm to about 10 μm and a line interval of about 50 μm to about 150 μm. When the metal-mesh satisfies the requirements on the line width and the line interval within the above described ranges, it may be laminated together with the transparent substrate 110, so that a light transmittance of at least about 90% can be secured. Thus, the production cost and production time for the transmittance variable film can be saved, but also sufficient transparency functionally required therefor can be obtained.

The transmittance variable film 100 and 200 may include an insulating layer 130 formed respectively on the wire electrode 120, as shown in FIGS. 1 and 2. By forming the insulating layer 130 on the wire electrode 120, it is possible to prevent a short circuit with the transparent electrode 150, and also ensure a stable operability and durability since it prevents a direct contact between the wire electrode and the charged particles 172 contained in the charged particle fluid 170 and avoid the charged particles 172 from escaping therethrough.

The transmittance variable film 100 and 200 may include a plurality of partition walls 140 positioned on both sides of the wire electrode 120. The plurality of the partition walls 140 are transparent and serve as a support for the whole structure of the transmittance variable film, and particularly serve to support the transparent electrode 150 formed thereon. In addition, the plurality of the partition walls may be configured to be a part of a cell 160, which serves as a container having the charged particle fluid therein, whereby a deflection of the charged particles can be prevented.

Each of the plurality of the partition walls 140 may have a width d2 of about 5 µm to about 30 µm, such as about 10 µm to about 15 µm. When each of the plurality of the partition walls 140 has a thickness within the above range, the transparent electrode 150 may be rigidly supported, and the deflection of the charged particle fluid can be prevented.

In addition, the plurality of the partition walls 140 may be arranged such that the distance d3 between the adjacent partition walls is about 1000 to about 2000 µm. This indicates a width of the cell 160. The volume of the cell 160 holding sufficient charged particle fluid can be obtained by arranging the plurality of the partition walls 140 at an interval within the above range, which can therefore rigidly support the transparent electrode 150, and at the same time provide excellent variation in transmittance effects.

The plurality of the partition walls may have a height of about 10 µm to about 30 µm, such as about 20 µm to about 25 µm. Such height d4 of the partition walls means the height of the cell. When the plurality of the partition walls have a height within the above range, the transmittance variable film can easily be operated at a low voltage (e.g., about 10 V to about 20 V). Further, an initial transmittance can be adjusted by controlling the height, and thereby controlling the amount of the charged particle fluid 170.

The insulating layer 130 and the plurality of the partition walls 140 may be integrally formed of a same material. As such, the insulating layer 130 and the plurality of the partition walls 140 may be integrally formed of a same material, such that the production cost and the production time can be saved.

The insulating layer 130 and the partition walls 140 may be a transparent resin, and include at least one selected from the group consisting of urethane acrylate, epoxy acrylate, polyester acrylate, polyether, and combinations thereof, and particularly include at least one of urethane acrylate and epoxy acrylate. In one embodiment, the insulating layer 130 and the partition walls 140 may include a urethane acrylate resin, so that a transmittance variable film which is strong against an external impact and has excellent durability due to a high elasticity of the urethane acrylate resin can be obtained.

A transparent electrode 150 may be formed on upper portion of the plurality of the partition walls 140. The transparent electrode 150 may act as a negative electrode (anode), and include an indium-tin oxide (ITO), a fluorine-tin oxide (FTO), an aluminum-zinc oxide (AZO), or a gallium-zinc oxide (GZO). In one embodiment, the transparent electrode 150 may be a front electrode including indium-tin oxide, thereby implementing a higher electrical conductivity.

The transparent electrode 150 may be formed by coating the oxide on top of the transparent film, and, in particular, prepared by coating an indium-tin oxide (ITO) on upper portion of the transparent film having polyethylene terephthalate (PET) material by means of sputtering deposition.

The thickness of the transparent electrode 150 may be about 50 to about 200 µm, and particularly about 120 to about 150 µm. When the transparent electrode 150 has a thickness within the above described range, the film having an excellent durability and flexibility as well can be achieved.

The transmittance variable film 100 and 200 may be configured such that the transparent electrode 150 is formed as ITO front electrode and the wire electrode 120 is formed as the metal-mesh, thereby resolving resource depletion and environmental problems and at the same time obtaining an excellent efficiency in the variation in transmittance.

The transmittance variable film 100 and 200 may include a cell 160 configured to be surrounded by the plurality of the partition walls 140, the insulating layer 130, and the transparent electrode 150, wherein the cell 160 may serve as a container holding the charged particle fluid 170 therein.

The charged particle fluid 170 refers to a fluid in which a plurality of charged particles 172 is dispersed in a hydrocarbon-based medium 171. The plurality of the charged particles 172 may be charged and colored particles. As shown in FIG. 1, before a voltage is applied to the transmittance variable film 100, the plurality of the charged particles 172 is freely dispersed in the hydrocarbon-based medium 171 to represent a non-transparent property. After a voltage is applied thereto, as shown in FIG. 2, the plurality of the charged particles 172 is gathered on top of the wire electrode 120, whereby the transmittance of the film is increased.

The hydrocarbon-based medium 171 is a transparent liquid, which has low volatility, high flash point and non-polar characteristics. This hydrocarbon-based medium may include at least one selected from the group consisting of n-dodecane, methyl methacrylate (MMA), undecane, and combinations thereof. In one embodiment, the hydrocarbon-based medium 171 may include n-dodecane, and thus it is advantageous in that it is not easily evaporated, but helps a smooth dispersion of the charged particles.

The plurality of the charged particles 172 may have a same charge one another. Specifically, in one embodiment, all of the plurality of the charged particles 172 may have a negative (−) charging property, and the wire electrode 120 may act as a positive electrode (cathode), whereby the plurality of the charged particles 172 may be integrally assembled on the wire electrode 120, whereby excellent variation in transmittance can be accomplished.

The transmittance variable film may have a variation in transmittance of about 20% to about 70%, particularly about 40% to about 70%, and more particularly about 50% to about 70%, as calculated by the following formula (1). The transmittance variable film includes an insulating layer having a thickness of about 0.4 µm to about 1 µm, whereby it can have a variation in transmittance within the above range, and can be used in a variety of fields that require high variation in transmittance properties, such as a variety of display devices.

Variation in transmittance (%)=final transmittance (%)−initial transmittance (%)  (1)

In the general formula (1), the final transmittance indicates a transmittance of the transmittance variable film as measured after a driving voltage is applied, and the initial transmittance indicates a transmittance of the transmittance variable film as measured before a driving voltage is applied.

The driving voltage may be about 10 V to about 40 V, such as about 40 V. The transmittance variable film includes a wire electrode and an insulating layer having a thickness of about 0.4 μm to about 1 μm formed on the wire electrode, whereby the reaction time for the variation in transmittance can be decreased, and excellent variation in transmittance can be achieved even at a low driving voltage.

Method for Producing Transmittance Variable Film

In another embodiment of the present disclosure, there is provided a method for producing a transmittance variable film, the method comprising: preparing a transparent substrate; forming a wire electrode on the transparent substrate via printing or etching process; forming an insulating layer and a plurality of partition walls integrally on the transparent substrate and the wire electrode via roll-to-roll process; curing the insulating layer and the plurality of the partition walls; forming a transparent electrode on the plurality of the partition walls; and injecting a charged particle fluid into a cell configured to be surrounded by the plurality of the partition walls, the insulating layer and the transparent electrode, wherein the insulating layer may be formed with a thickness of 0.4 μm to 1 μm.

The details on the transparent substrate are as previously described.

In the step of forming the wire electrode, the wire electrode may be formed by laminating a metal-mesh on the transparent substrate through printing or etching process. The details made on the metal-mesh are as described above. In one embodiment, the wire electrode may be formed through a printing process, particularly by jetting an ink solution containing a metal powder to form the wire electrode in a form of a metal-mesh. In forming the wire electrode, by way of a printing process, finer patterns may be formed, such that the production process may be simplified to reduce the production cost and time.

In the step of forming the insulating layer and the plurality of the partition walls integrally, the insulating layer and the plurality of the partition walls may be formed by a roll-to-roll process. Specifically, the step of forming the insulating layer and the plurality of the partition walls integrally may include providing a roll around which a mold having a structure of the plurality of the partition walls imprinted therein is wound; applying a resin composition to the roll; and rolling the roll over the transparent substrate.

The resin composition may include at least one selected from the group consisting of urethane acrylate, epoxy acrylate, polyester acrylate, polyether, and combination thereof. In one embodiment, the resin composition may include at least one of urethane acrylate and epoxy acrylate.

The insulating layer and the plurality of the partition walls are integrally formed through roll-to-roll process, whereby the production cost and production time can be reduced. Further, the insulating layer may be easily formed with a thickness of 0.4 μm to 1 μm, whereby excellent variation in transmittance can also be implemented.

The transmittance variable film may have 0.4 μm to 1 μm thick insulating layer, such that a rapid variation in transmittance can be accomplished even at a low voltage, and the charged particles can be prevented from passing through the electrodes, as well as a short circuit between the anode and the cathode can be avoided.

In addition, the insulating layer and the plurality of the partition walls are integrally formed by the method for producing a transmittance variable film, whereby the production cost and production time can be reduced and also the insulating layer having a thickness of 0.4 μm to 1 μm can easily be prepared.

Hereinafter, exemplary Examples of the present disclosure will now be described. However, it should be noted that while the exemplary examples are listed for explaining the present disclosure, the present disclosure is not limited to these exemplary examples.

EXAMPLES AND COMPARATIVE EXAMPLES

Example 1

Polyethylene terephthalate (PET) film having a thickness of 120 μm was provided as a transparent substrate. Then, an ink solution containing a silver powder was jetted over the transparent substrate by way of printing in a metal-mesh pattern to thereby form a wire electrode. Then, a roll around which a mold having a plurality of partition walls imprinted therein was wound was applied by a resin containing a non-solvent type of urethane acrylate, and subsequently rolled over the transparent substrate and the wire electrode to integrally form the insulating layer of 0.4 μm thick and the plurality of the partition walls. Then, the insulating layer and the partition walls were photo-cured with energy of about 350 mJ/cm$^2$. Then, a transparent electrode having an indium-tin oxide (ITO) was laminated on the plurality of the partition walls. Then, a charged particle fluid into which a plurality of charged particles having a negative (−) charge in a hydrocarbon-based medium was dispersed was injected into a cell configured to be surrounded by the plurality of the partition walls, the insulating layer and the transparent electrode to thereby prepare a transmittance variable film.

Example 2

The transmittance variable film was prepared in a similar manner as in Example 1, except that the insulating layer was provided with a thickness of 0.8 μm.

Example 3

The transmittance variable film was prepared in a similar manner as in Example 1, except that the insulating layer was provided with a thickness of 1 μm.

Comparative Example 1

The transmittance variable film was prepared in a similar manner as in Example 1, except that the insulating layer was provided with a thickness of 2 μm.

Comparative Example 2

The transmittance variable film was prepared in a similar manner as in Example 1, except that the insulating layer was provided with a thickness of 3 μm.

Evaluation

Experiment 1: Measurement of Variation in Transmittance

For the transmittance variable films prepared in Examples 1 to 3 and Comparative Examples 1 and 2, initial transmittance and final transmittance were measured at the wavelength of 500 nm using a transmittance measurement apparatus ("haze-gard plus," BYK-Gardner GmbH), and variation in transmittance were calculated by the general formula (1). The results were reported in Table 1 below. The initial transmittance indicates a transmittance of the transmittance variable film prior to applying a voltage to the film, and the final transmittance indicates a transmittance of the transmittance variable film after applying a voltage of about 40 V to the film.

Variation in transmittance (%)=final transmittance (%)−initial transmittance (%)  (1)

TABLE 1

| | Thickness of insulating layer [μm] | Variation in transmittance (%) |
|---|---|---|
| Ex. 1 | 0.4 | 50.2 |
| Ex. 2 | 0.8 | 47.1 |
| Ex. 3 | 1 | 45.3 |
| C. Ex. 1 | 2 | 16.3 |
| C. Ex. 2 | 3 | 7.9 |

As shown in Table 1, it can be seen that the transmittance variable films having an insulating layer of 0.4 μm to 1 μm thickness according to Examples 1 to 3 show a higher variation in transmittance compared to the transmittance variable films according to Comparative Examples 1 and 2. In other words, the transmittance variable films of Examples 1 to 3 can have faster variation in transmittance rates than the transmittance variable films of Comparative Examples 1 and 2, and thereby can show a superior optical function.

While the preferred examples of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

The invention claimed is:

1. A transmittance variable film, comprising:
a transparent substrate;
a wire electrode formed on the transparent substrate, wherein
the wire electrode has a metal-mesh structure comprising silver, copper or aluminum, and
the metal-mesh structure has a line width ranging from 2 μm to 20 μm, and a line interval ranging from 40 μm to 300 μm;
an insulating layer formed on the wire electrode;
a plurality of partition walls positioned on both sides of the wire electrode;
a transparent electrode formed on the plurality of the partition walls;
a cell configured to be surrounded by the plurality of the partition walls, the insulating layer and the transparent electrode; and
a charged particle fluid contained inside the cell,
wherein the insulating layer is formed with a thickness of 0.4 μm to 1 μm.

2. The transmittance variable film of claim 1, wherein the insulating layer and the partition walls are integrally formed of a same material.

3. The transmittance variable film of claim 1, wherein the insulating layer and the partition walls comprise at least one selected from the group consisting of urethane acrylate, epoxy acrylate, polyester acrylate, polyether, and combinations thereof.

4. The transmittance variable film of claim 1, wherein the transparent substrate comprises at least one selected from the group consisting of polyethylene terephthalate (PET), polyvinyl chloride (PVC), thermoplastic polyurethane (TPU), and combinations thereof.

5. The transmittance variable film of claim 1, wherein the charged particle fluid comprises a plurality of charged particles dispersed in a hydrocarbon-based medium.

6. The transmittance variable film of claim 5, wherein the hydrocarbon-based medium comprises at least one selected from the group consisting of n-dodecane, methyl methacrylate (MMA), undecane, and combinations thereof.

7. The transmittance variable film of claim 5, wherein the plurality of the charged particles have a same charge one another.

8. The transmittance variable film of claim 1, wherein the transparent electrode comprises an indium-tin oxide (ITO), a fluorine-tin oxide (FTO), an aluminum-zinc oxide (AZO), or a gallium-zinc oxide (GZO).

9. The transmittance variable film of claim 1, wherein the transmittance variable film has a variation in transmittance of 20% to 70%, as calculated by the following formula (1):

Variation in Transmittance (%)=Final Transmittance (%)−Initial Transmittance (%).  (1)

10. A method for producing a transmittance variable film, comprising:
preparing a transparent substrate;
forming a wire electrode having a metal-mesh structure on the transparent substrate via printing or etching process, wherein the metal-mesh structure has a line width ranging from 2 μm to 20 μm, and a line interval ranging from 40 μm to 300 μm;
forming an insulating layer and a plurality of partition walls integrally on the transparent substrate and the wire electrode via roll-to-roll process;
curing the insulating layer and the plurality of the partition walls;
forming a transparent electrode on the plurality of the partition walls; and
injecting a charged particle fluid into a cell configured to be surrounded by the plurality of the partition walls, the insulating layer and the transparent electrode,
wherein the insulating layer is formed with a thickness of 0.4 μm to 1 μm.

11. The method for producing a transmittance variable film of claim 10, wherein the step of forming an insulating layer and a plurality of partition walls integrally comprises:
providing a roll around which a mold having a structure of the plurality of the partition walls imprinted therein is wound;
applying a resin composition to the roll; and
rolling the roll over the transparent substrate and the wire electrode.

12. The method for producing a transmittance variable film of claim 11, wherein the resin composition comprises at least one selected from the group consisting of urethane acrylate, epoxy acrylate, polyester acrylate, polyether, and combinations thereof.

* * * * *